United States Patent
Brieske

[15] 3,664,058
[45] May 23, 1972

[54] INFLATABLE PLASTIC STRUCTURES

[72] Inventor: Bernard F. Brieske, 241 Tall Trees Lane, Palatine, Ill. 60067

[22] Filed: Apr. 19, 1971

[21] Appl. No.: 135,127

[52] U.S. Cl. ............................................................ 46/90
[51] Int. Cl. ...................................................... A63h 3/06
[58] Field of Search ........................................ 46/90, 87, 88

[56] References Cited

FOREIGN PATENTS OR APPLICATIONS 912,716   1962   England .................................... 46/90

Primary Examiner—Louis G. Mancene
Assistant Examiner—D. L. Weinhold
Attorney—McDougall, Hersh & Scott

[57] ABSTRACT

An inflatable plastic construction formed of multiple layers of plastic sheets. Transparent exterior sheets are located adjacent interior sheets with printing substances being disposed between the facing surfaces of the respective sheets. An air holding space is defined between the interior sheets. The assembly is heat sealed all around its periphery with the exception of an area provided for a valve mechanism. The valve mechanism is formed from the sheet material, and it permits the introduction of air but inhibits the release of air whereby the structure remains inflated.

4 Claims, 6 Drawing Figures

Patented May 23, 1972 3,664,058
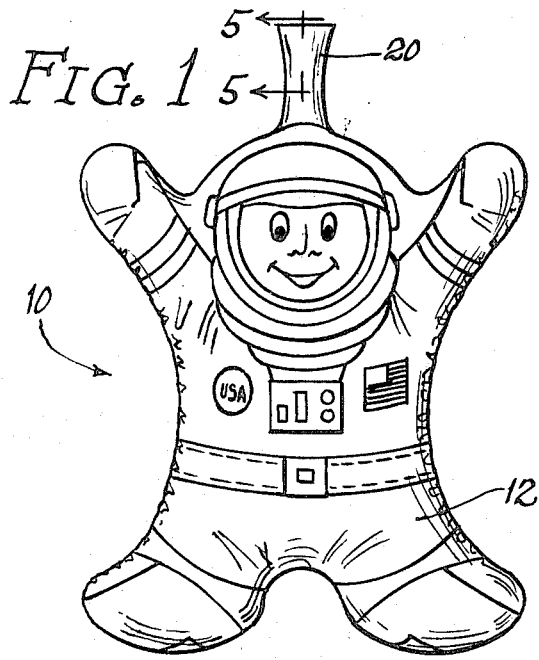
FIG. 1
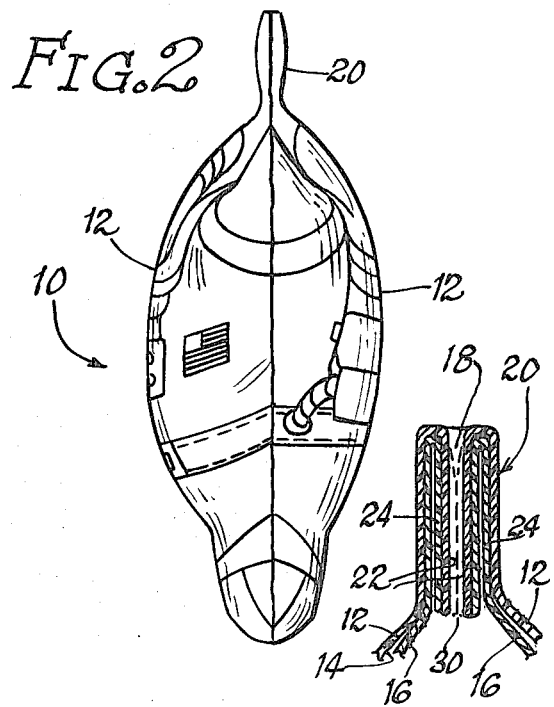
FIG. 2
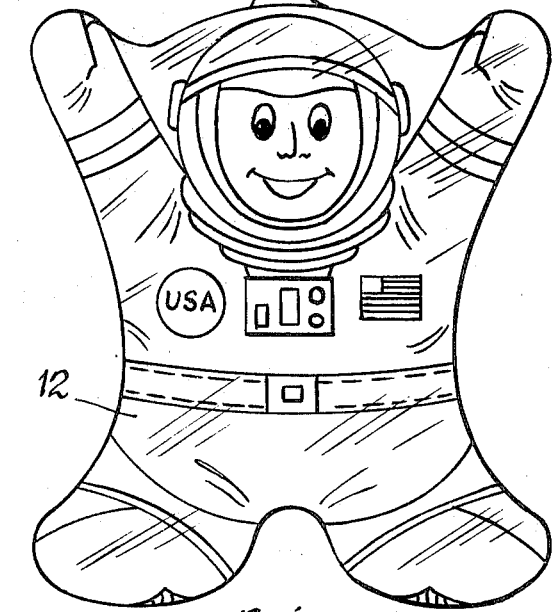
FIG. 5
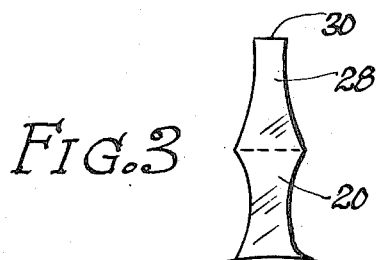
FIG. 3
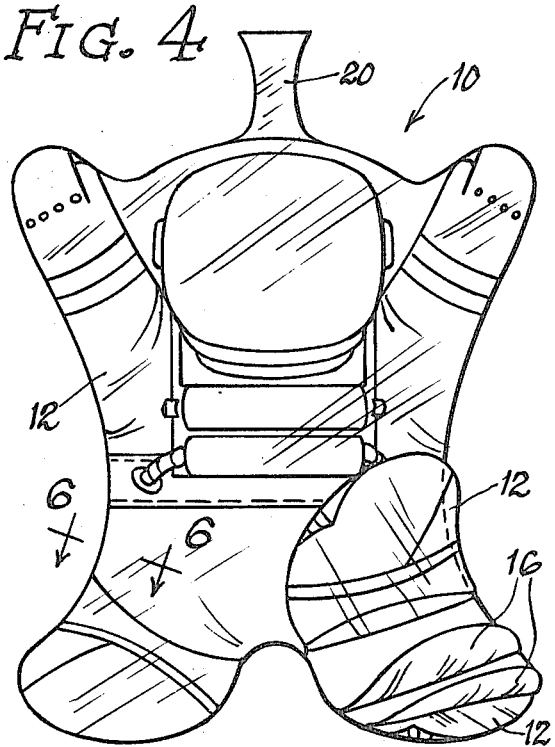
FIG. 4
FIG. 6
INVENTOR
Bernard F. Brieske
by McDougall, Hersh
and Scott Attys

INFLATABLE PLASTIC STRUCTURES

This invention is concerned with inflatable plastic structures and with methods for producing such structures. The invention is particularly directed to inflatable articles which can be developed into caricatures, and employed for amusement purposes.

A variety of flexible plastic articles have been developed for use as amusement devices, particularly articles such as described in applicant's U.S. PAT. No. 3,564,807 issued on Feb. 23, 1971. The articles described therein comprise plastic puppets which are formed of heat sealable material. These puppets can be manufactured in large numbers and, therefore, produced at very low cost.

In view of the fact that the plastic hand puppets can be manufactured in large numbers at low cost, the puppets are very suitable for use as premiums. Thus, it is relatively inexpensive for manufacturers to associate the puppets with their products for purposes of adding to the sales appeal of the products.

As explained in the aforementioned patent, limitations are encountered where printing substances are associated with the plastic. Thus, the hand puppets become especially appealing when they are in the shape of cartoon characters or when they illustrate cartoon characters, and this can only be accomplished by printing directly on the plastic material. The printing substances are, however, unsuitable for use with food products in view of government regulations which protect consumers against contamination.

Applicant has recognized that in addition to hand puppets, other flexible plastic articles have definite appeal for use as premiums and for similar large scale production. Specifically, applicant has developed an inflatable plastic structure which can be made in the form of a caricature whereby a particularly amusing structure can be achieved. It is also of great importance to produce such structures whereby printing substances can be employed for providing colorful characters while at the same time avoiding contamination of products which may come in contact with the structures.

The use of printing substances in association with the inflatable structures cannot be achieved without modification of standard manufacturing practices. Thus, printed areas of flexible plastic sheets cannot be heat sealed together in any satisfactory way. Furthermore, conventional printing methods involve electron bombardment to prepare the surfaces for receiving the printing substances. It has been found that such treated surfaces cannot be heat sealed for the formation of a sufficiently strong, air-tight seal. Thus, leaks and tears developed to an intolerable degree when the treated surfaces are mated and, therefore, applicant's developments required modifications of the standard structures whereby a strong air-tight seal could b accomplished. It was necessary to achieve this while at the same time providing a structure which is uncontaminated and which permits the incorporation of an inexpensive one-way valve produced from the same flexible plastic sheets.

It is a general object of this invention to provide an improved inflatable, flexible plastic construction which can be economically produced on a large scale and which can be printed to provide a colorful structure without any danger of contamination due to the presence of printing substances.

It is a more particular object of this invention to provide a structure of the type described which includes a multi-layer plastic arrangement whereby heat sealing of the structure to provide an air-tight seal can be accomplished without interference from printing substances or treated surfaces associated with the construction.

These and other objects of this invention will appear hereinafter and for purposes of illustration, but not of limitation, specific embodiments of the invention are shown in the accompanying drawings in which:

FIG. 1 is an elevational view of an inflatable structure characterized by the features of this invention;

FIG. 2 is a side elevation of the structure shown in FIG. 1;

FIG. 3 is a plan view of a front sheet employed in the structure;

FIG. 4 is a rear plan view of the structure showing the sheets making up the structure partially peeled back;

FIG. 5 is an enlarged fragmentary, sectional view of the valve structure of the invention taken about the line 5—5 of FIG. 1; and, FIG. 6 is an enlarged fragmentary, sectional view illustrating the multiple sheets of the structure taken about the line 6—6 of FIG. 4.

This invention generally relates to an inflatable plastic construction formed of multiple layers of flexible plastic sheets. The sheets include at least one transparent sheet and first and second additional sheets are provided with one of these sheets being positioned adjacent the interior facing surface and with the other being connected to that sheet. The two additional sheets form a space for holding air which is introduced into the structure through an appropriate valve. A pair of exterior transparent sheets are preferably provided and printing substances are located either on the interior facing surfaces of the transparent sheets or on the exterior surfaces of the additional interior sheets whereby the printing substances are inaccessible insofar as any food product or other product which may be brought into contact with the inflatable construction. Thus, the presence of the additional sheets serves to confine the printing substances within the space defined between the sheets.

The entire assembly is heat sealed around the edges of the sheets with the heat sealing tools preferably being designed to provide a distinctive shape for the inflated structure. The only access between the sheets is provided by an inflating valve which permits the introduction of air but which automatically restricts the return passage of air. As noted, in the preferred form of the invention, transparent sheets are provided on both sides with the two additional sheets interposed between the transparent sheets. In all instances, the printing substances are located on one of the interior surfaces of the sheets whereby the colors can be observed while the printing substances are inaccessible from a contamination standpoint.

The structure 10 illustrated in the accompanying drawings comprises a caricature of a human figure. The body of the structure is made up of outer sheets 12 of essentially transparent flexible plastic material. Polyethylene is a preferred material for producing structures of the type described; however, other natural and synthetic plastic materials having similar properties may be utilized.

The outer sheets 12 may be printed on their interior facing surfaces 14. Since the sheets are essentially transparent, the printing substances will be visible from the exterior of the structure. A reverse printing of the figures is required so that a right reading illustration will be observed.

A pair of additional sheets 16 are located inside the sheets 12. These sheets 16 may be of the same flexible plastic material as the sheets 12 or they may be of a different material provided that proper heat sealing can be achieved. The exterior surfaces 17 of these sheets may carry the printing substances which will be visible through the sheets 12 and which will be right reading.

The sheets 16 also function as an air holding space when the structure is inflated, and it is important to provide a material which will heat seal in a strong continuous fashion so that the possibility of leakage around the periphery of the structure will be minimized. The inner surfaces 19 of sheets 16 are free of pigment or any treatment such as electron bombardment which would prevent the formation of a strong, air-tight seal. The surfaces 14 and 17 are preferably maintained free of printing substances in the area of the seal so that sufficient adherence is obtained. Even though at least one of the surfaces 14 and 17 may be treated in the seal area, a sufficiently strong seal to maintain the assembly is still possible.

The structure is preferably provided with a valve structure which can be formed with the flexible plastic sheets utilized for forming the body of the structure. As best shown in FIG. 5, the double layers formed by the sheets include return portions with a passage 18 defined between these return portions. The return portions and the passage formed thereby are preferably located at the head of the caricature as shown at 20 in FIG. 1. The return portions include extensions 22 of the outer sheets 12 and extensions 24 of the inner sheets 16. A one-way valve arrangement is provided in conventional fashion in that air can be forced through the passage 18 to inflate the structure; however, the air will not leak out through the passage 18 since the surfaces of the extensions 22 will be forced together by the air pressure within the structure to form a suitable seal.

The arrangement described is capable of providing inflatable structures on a consistent, high production basis. The presence of the sheets 16 in particular enables the formation of a strong, air-tight heat seal as shown at 26 in FIG. 6. The heat seal is preferably provided by means of a die cutting tool having a heated blade. The heated die cutting tool is employed so that the heat seal will be formed at all adjoining edges of the sheets simultaneously with a die cutting operation which separates the sheet portions 12 and 16 from continuous webs usually employed in high production operations.

The die cutting tool is designed so that the assembly will assume the arrangement illustrated in FIG. 3. The section 28 of the portion 20 is folded inwardly from the position shown in FIG. 3 to provide the passage 18. The die cutting tool is, of course, designed so that the edge 30 is not heat sealed in order to provide the necessary opening into the interior of the structure.

The arrangement described permits the formation of inflatable structures without any danger of contamination due to the presence of printing substances. Thus, the surfaces 14 and/or 17 which carry the printing substances will be completely out of contact with any food product or other material associated with the structure. The design of the invention also enables the formation of a satisfactory seal since the printing substances or treated surfaces will not interfere with the seal for the air space defined between the sheets 16. As noted, it has been found that treated surfaces will heat so that the sheets 12 will satisfactorily adhere to the sheets 16. The heat seal thus formed, however, is not sufficiently strong or continuous to serve in an inflatable structure. The use of the sheet 16 solves this problem since the sheets 16 will provide the desired strength and continuity for sealing the air space.

Particularly where the structures are to be used in association with a food product, the structures can be sterilized to eliminate any contamination on their exterior surfaces. Reference is made to applicant's aforementioned patent, and to U.S. PAT. No. 2,938,766 for a description of a suitable sterilizing procedure.

It will be understood that various changes and modifications may be made in the above described construction which provide the characteristics of this invention without departing from the spirit thereof particularly as defined in the following claims.

That which is claimed is:

1. An inflatable plastic construction comprising multiple layers of plastic sheets, said sheets including at least one transparent sheet having printing on an interior facing surface, and first and second additional sheets, the first additional sheet being positioned adjacent said interior facing surface whereby the printing substance is confined between the transparent sheet and said first sheet while being visible through said transparent sheet, the second additional sheet being positioned adjacent said first additional sheet whereby an air holding space is defined therebetween, a valve mechanism adapted to permit the introduction of air into said space but inhibiting passage of air out of said space, said valve mechanism being formed by at least some of said sheets, and a heat seal extending from said valve mechanism all around the edge of said air holding space whereby the combination of the heat seal and the valve mechanism serve to confine air within said space.

2. A construction in accordance with claim 1 wherein first and second transparent sheets are included in the construction, both of said sheets having printing substances on their interior facing surfaces with the respective additional sheets being located in overlying relationship relative to the surfaces carrying the printing substances.

3. A construction in accordance with claim 2 wherein said construction comprises a caricature, said valve mechanism being located at the head of the caricature.

4. A construction in accordance with claim 3 wherein said additional sheets are pigmented to thereby provide a background for areas of the transparent sheets which are free of printing substances.

* * * * *